J. J. WOOD.
DYNAMO ELECTRIC MACHINE.
APPLICATION FILED NOV. 22, 1907.

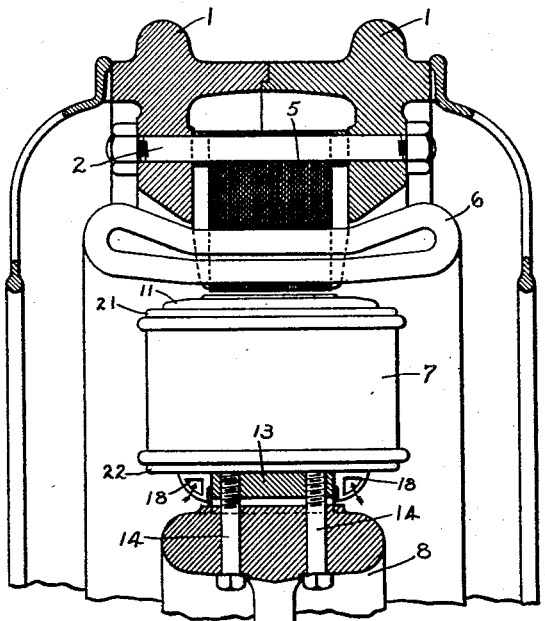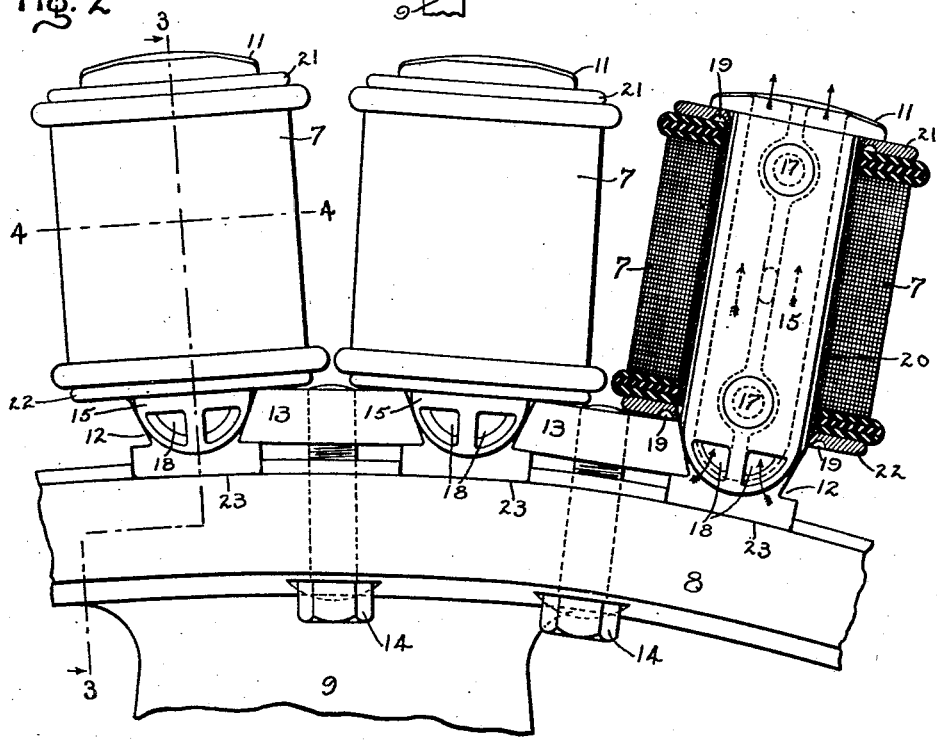

919,511.

Patented Apr. 27, 1909.
2 SHEETS—SHEET 2.

WITNESSES:
Lester H. Fulmer.
J. Ellis Glen

INVENTOR
JAMES J. WOOD.
BY Albert G. Davis
ATT'Y.

UNITED STATES PATENT OFFICE.

JAMES J. WOOD, OF FORT WAYNE, INDIANA.

DYNAMO-ELECTRIC MACHINE.

No. 919,511.  Specification of Letters Patent.  Patented April 27, 1909.

Application filed November 22, 1907. Serial No. 403,313.

*To all whom it may concern:*

Be it known that I, JAMES J. WOOD, a citizen of the United States, residing at Fort Wayne, county of Allen, State of Indiana, have invented certain new and useful Improvements in Dynamo-Electric Machines, of which the following is a specification.

My invention relates to dynamo-electric machines and more particularly to the field magnets thereof and also to the means for attaching them to the spider of a revolving field machine.

When a revolving field is rotating at a high speed there is a large centrifugal force acting on the field magnets, and by my method of clamping them in place great mechanical strength in a tangential direction is secured because of the large surface of contact of the retaining means. The electrical advantage possessed by my construction is its low magnetic reluctance due to the fact that the pole-pieces are not cut out in the center, as heretofore, and that the magnetic path is entirely through steel, as will be hereafter explained.

The various features of novelty which characterize my invention are pointed out with particularity in the claims annexed to and forming a part of this specification.

For a better understanding of my invention, however, and other advantages possessed by it, reference may be had to the following description taken in connection with the accompanying drawing, in which—

Figure 3:
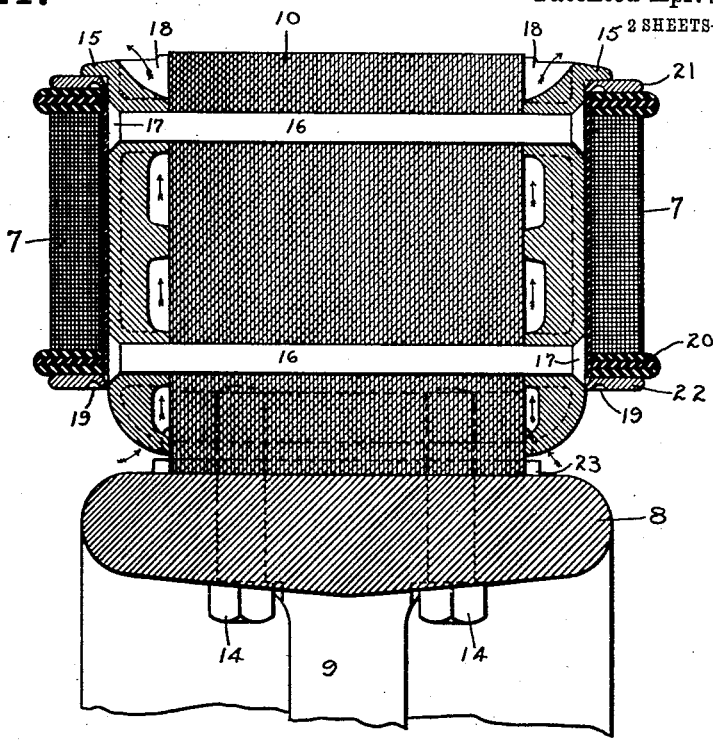
Figure 4:
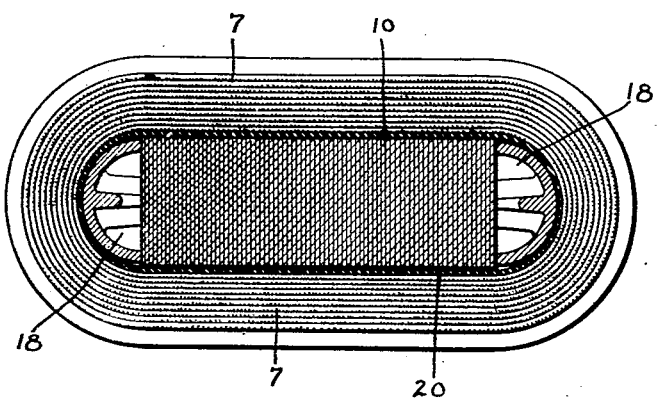

Figure 1 is a section through a portion of a revolving field alternator embodying my invention; Fig. 2 is a view of a portion of a field spider having the field magnets mounted thereon in accordance with my invention, one of the field windings being in section; Fig. 3 is a section on the line 3—3 of Fig. 2 looking in the direction of the arrows, and Fig. 4 is a section on the line 4—4 of Fig. 2.

Referring now to the drawing, the frame 1 is split in the center, and the bolts 2 holding the frame together pass through the punchings 5. The armature winding 6 is embedded in slots in the laminations 5. The field magnets are held in place on the spider 8, which may have central arms 9 with my construction for holding the magnets in place.

The laminæ 10 of the field poles have tips 11 overhanging the field coils 7, and indentations 12 into which the wedge-shaped retaining pieces 13 for the field magnets fit. These retaining portions are preferably made of steel and are fastened to the field spider by means of bolts 14. The laminæ 10 of the field poles are clamped between end members 15 by rivets 16, the heads 17 of which are countersunk in the end members. These end members have longitudinal air passages 18 in them, so that by the revolution of the machine air is set in motion and passes through these passages in the direction of the arrows, cooling the end laminæ and the field and armature windings.

The field winding 7 is wound upon a spool 20 in any preferred manner. In assembling the spool upon the field poles I first place the brass collar 21 upon the pole pieces, then the wound spool 20, and then a second brass collar 22. These brass collars have grooves 19, and are forced upon the field poles under a screw press, causing the edges of the metal to bend back and reducing the dimension of the grooves as shown. This method of forcing on the brass collars has the advantage that it avoids the filing of the collars to fit and that the edges of the metal against the pole is under compression and consequently makes a very tight fit.

To assemble the field magnets upon the spider, I prefer to bolt the wedge-shaped retaining pieces 13 loosely on the spider 8, then move the field magnets into axially extending grooves 23 on the rim of the spider, the retaining pieces entering the indentations 12. When the magnets are in their proper position the bolts 14 may be tightened so as to firmly hold them there.

The advantages of my retaining means for the field magnets are manifold. By constructing the wedge-shaped pieces 13 of steel the entire path of the magnetic flux is through steel, the cast-iron spider being a path in parallel with the retaining pieces. This construction also adapts itself perfectly to changing the air gap 24 by inserting shims under the pole pieces, and this is done without increasing the magnetic reluctance of the circuit for the same reason as above. Further, the poles can be removed from the machine without removing the bolts and retaining pieces by simply loosening the latter. However, my retaining pieces 13 may be made of other metal, or may be a laminated structure.

What I claim as new, and desire to secure by Letters Patent of the United States, is,—

1. In a dynamo-electric machine, a spider, pole pieces having indentations, a retaining piece fitting in said indentations in adjacent pole pieces, and means for clamping said retaining pieces to said spider thereby holding said pole pieces in place.

2. In a dynamo-electric machine, a spider, laminated pole pieces, each lamina having similar indentations on both sides thereof, a retaining piece fitting in said indentations in adjacent pole pieces, and means for clamping said retaining pieces to said spider thereby holding said pole pieces in place.

3. In a dynamo-electric machine, a spider, laminated pole pieces, each lamina having similar indentations on both sides thereof, a steel retaining piece fitting in said indentations, and means for clamping said retaining pieces to said spider thereby holding said pole pieces in place.

4. In a dynamo-electric machine, a spider, laminated pole pieces, each lamina having indentations on both sides thereof, a steel wedge-shaped retaining piece fitting in said indentations, and bolts clamping said retaining pieces to said spider thereby holding said pole pieces in place.

5. In a dynamo-electric machine, a spider 8, laminated pole pieces having indentations 12, wedge-shaped retaining pieces 13 fitting in said indentations, and bolts 14 clamping said retaining pieces to said spider, substantially as described.

6. A field magnet comprising a pole piece, a brass collar mounted thereon, said brass collar being forced upon the pole piece and having grooves near the inner edge, the inner edges of the brass collar being under compression and fitting tightly against the pole piece, substantially as described.

In witness whereof, I have hereunto set my hand this 15th day of November, 1907.

JAMES J. WOOD.

Witnesses:
W. H. CRIGHTON,
F. S. HUNTING.